United States Patent [19]

Bobeck

[11] 3,810,132

[45] May 7, 1974

[54] INTEGRATED BUBBLE EXPANSION DETECTOR AND DYNAMIC GUARD RAIL ARRANGEMENT

[75] Inventor: Andrew Henry Bobeck, Chatham, N.J.

[73] Assignee: Bell Telephone Laboratories, Incorporated, Murray Hill, N.J.

[22] Filed: Nov. 24, 1972

[21] Appl. No.: 309,204

[52] U.S. Cl. .................... 340/174 EB, 340/174 TF
[51] Int. Cl. .......................................... G11c 11/14
[58] Field of Search ................ 340/174 EB, 174 TF

[56] References Cited

UNITED STATES PATENTS

| | | | |
|---|---|---|---|
| 3,691,540 | 9/1972 | Almasi et al. | 340/174 TF |
| 3,702,995 | 11/1972 | Bobeck et al. | 340/174 TF |
| 3,706,081 | 12/1972 | Bobeck et al. | 340/174 TF |
| 3,713,117 | 1/1973 | Bobeck | 340/174 TF |
| 3,713,120 | 1/1973 | Bobeck et al. | 340/174 TF |

*Primary Examiner*—Stanley M. Urynowicz, Jr.
*Attorney, Agent, or Firm*—W. L. Keefauver

[57] ABSTRACT

A magnetic bubble expansion detector for a bubble memory is incorporated into a dynamic guard rail encompassing that memory in order to eliminate expanded bubbles after detection without shrinking the bubbles to normal size.

7 Claims, 2 Drawing Figures

INTEGRATED BUBBLE EXPANSION DETECTOR AND DYNAMIC GUARD RAIL ARRANGEMENT

FIELD OF THE INVENTION

This invention relates to information storage arrangements in which information is represented as patterns of single wall domains, the most common type of which are commonly referred to as magnetic bubbles.

BACKGROUND OF THE INVENTION

My copending applications, Ser. Nos. 201,755 now U.S. Pat. No. 3,702,995 and 228,199, filed Nov. 24, 1971 and Feb. 22, 1972, respectively, describe an expansion detector and a dynamic guard rail arrangement for bubbles. In the former application, consecutive stages of a bubble channel include increasingly larger numbers of magnetically soft elements spaced close together in a "fine-grained" arrangement. The elements of each stage operate, in concert, in response to a magnetic field reorienting in the plane of bubble movement to expand a bubble laterally with respect to the direction of bubble movement as the bubble advances. A magnetoresistance element couples the stage with the largest number of elements for producing a signal when a bubble is present there. After an expanded bubble is detected, it is advanced through consecutive stages with decreasing numbers of elements. The domain shrinks as it is advanced and is delivered to an annihilation position if destructive read is to be effected.

The latter application discloses a circuit which also is responsive to a reorienting in-plane field to move spurious bubbles from the area of an operative bubble memory. The circuit is defined by magnetically soft elements in a multistage pattern which encompasses the operative memory. The elements of each stage of the circuit are positioned to move domains outwardly from the operative memory rather than from stage to stage thereabout.

BRIEF DESCRIPTION OF THE INVENTION

The present invention is based on the recognition that the operations of the expansion detector and the dynamic guard rail are not mutually exclusive and that the expansion detector can be advantageously incorporated into the guard rail in a manner which permits the guard rail to eliminate expanded domains directly without the necessity of first reducing those domains to normal operating size.

In one embodiment, a guard rail of T- and chevron-shaped elements includes integrated with it a chevron pattern which defines an expansion detector. A magnetoresistance element is disposed astride the path of a data domain moved to an output position in a memory encompassed by the guard rail and expanded during movement past the detector and through the guard rail. Operation is responsive to a rotating in-plane field in the "field-access" mode of operation.

DETAILED DESCRIPTION

Figure 1:
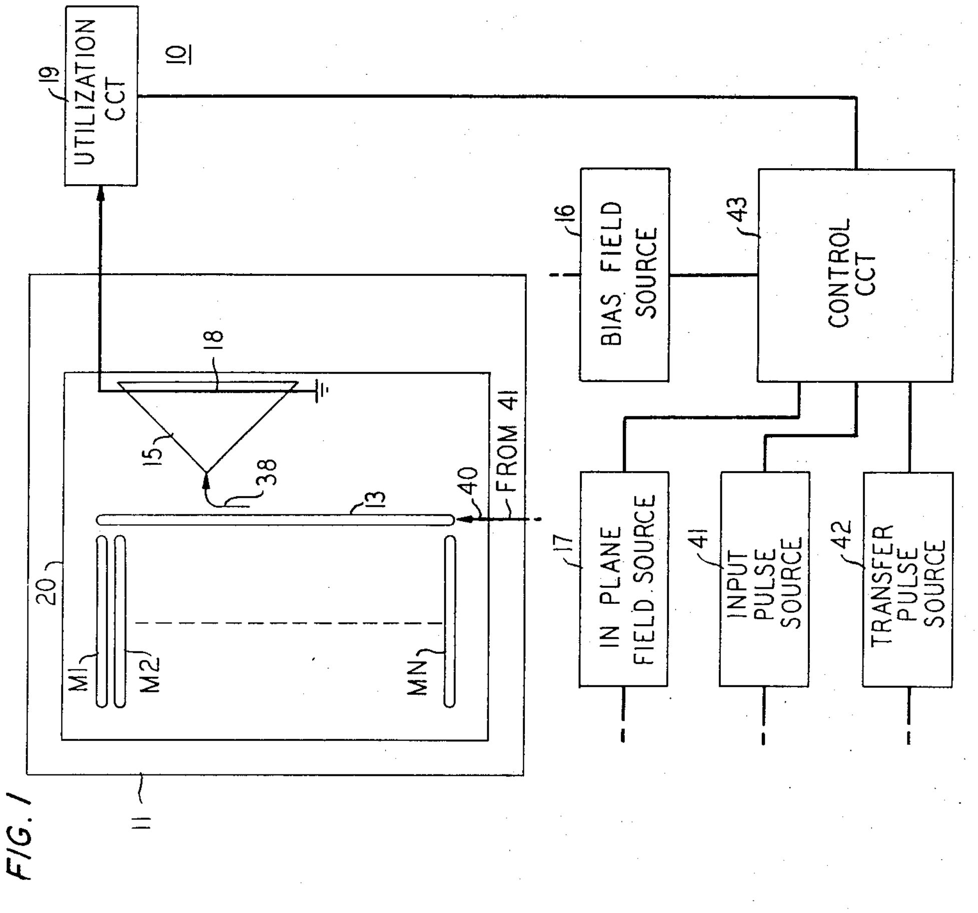
FIG. 1 is a schematic representation of an integrated expansion detector-dynamic guard rail arrangement in accordance with this invention.

FIG. 1 shows a bubble memory arrangement 10 including a layer 11 of material in which single wall domains can be moved. A plurality of loops are defined for recirculating information thereabout. The loops are formed by patterns of magnetically soft elements of, for example, T-bar or chevron-shaped geometries responsive to a magnetic field rotating in the plane of layer 11 in what is commonly known as a "field-access" arrangement. The loops are indicated in FIG. 1 by closed lines designated MI—MN and 13. The loops MI—MN represent minor loops of a bubble major-minor memory and loop 13 represents the major loop.

Operation of a major-minor memory is well known and not discussed herein. It is important for an understanding of this invention only that information is supplied by such a memory to an expansion detector represented in FIG. 1 by triangle 15.

Expansion detectors are also well known. Such a detector is formed by a multistage pattern of elements where consecutive stages comprise increasingly larger numbers of elements operative in response to a rotating in-plane field to expand domains laterally with respect to the direction of movement of the domain without changing the bias field which is operative to maintain a nominal bubble diameter.

The bias field and in-plane field sources are represented by blocks 16 and 17 of FIG. 1.

The expansion detector is coupled by a magnetoresistance element 18 operative to apply a signal to utilization circuit 19 when coupled by an expanded domain. In accordance with the present invention the expansion detector is integrated with a dynamic guard rail to deliver to the guard rail an expanded domain just detected. The guard rail is indicated in FIG. 1 by the line 20 enclosing the representation of the major-minor memory.

Figure 2:
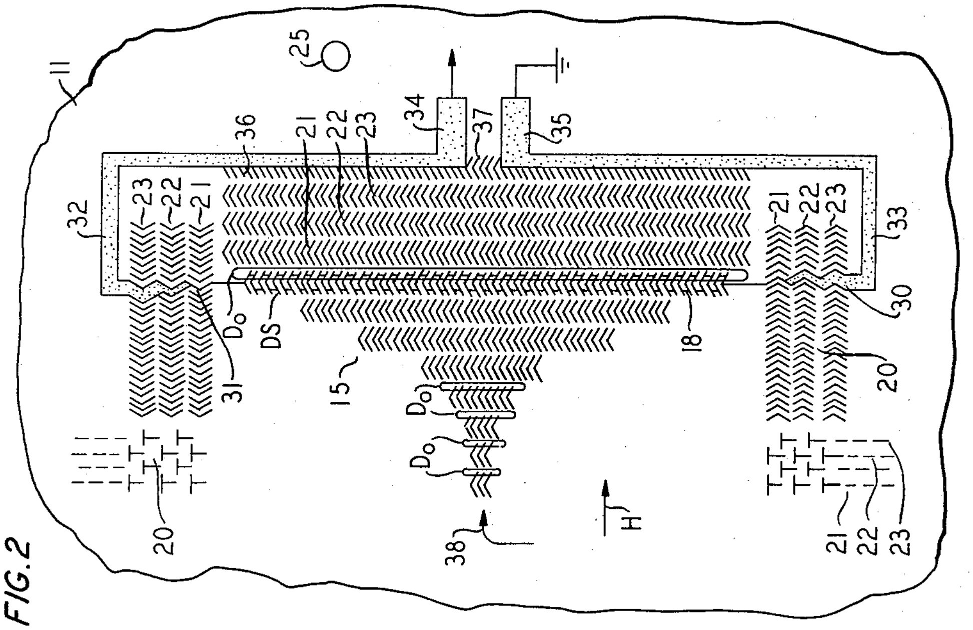
FIG. 2 is a schematic representation of a portion of the arrangement of FIG. 1 showing magnetic conditions therein during operation.

A portion of the guard rail is shown in detail in FIG. 2. Generally, the guard rail comprises several consecutive rows of elements designated 21, 22, and 23 in FIG. 2. The elements are of T- or chevron-shaped geometries as shown and are disposed to move spurious domains outwardly from the encompassed memory. FIG. 2 shows a detector stage DS of expansion detector 15 integrated with the dynamic guard rail so that the rows 21, 22, and 23 of the guard rail follow the detection stage directly. In this manner, expanded domains are advanced normally in response to the rotating in-plane field through the detector stage and the guard rail into the region of layer 11 external to the guard rail. When an expanded domain is expelled by the guard rail, it is in an area where its effect on memory operation is negligible and where it shrinks to normal operating size dictated by the bias field.

The expansion sequence for domains is shown for consecutive domain positions for an in-plane field directed to the right in consecutive cycles of operation as shown by arrow H in FIG. 2. A domain Do assumes the consecutive positions moving from left to right in FIG. 2, reaching the fully expanded shape as shown in stage DS. The domain continues to advance to the right, maintaining the shape shown in stage DS for three more cycles of the in-plane field for the illustrative embodiment. Thereafter, the domain is expelled beyond the guard rail and contracts to bubble size as shown at 25.

The magnetoresistance element is shown of a meandering geometry disclosed in my copending application Ser. No. 240,651 filed Apr. 3, 1972 now U.S. Pat. No. 3,713,120. FIG. 2 shows the external electrical connections to that element being of a relatively wide geometry to be made of permalloy as is the magnetoresistance element. The extensions of the element, designated 30 and 31 in the figure, specifically, increase in width and are of undulating geometry as they pass through the guard rail. The spacings between increasing numbers of chevron elements of the guard rail are filled in with permalloy to form the extensions as shown in the figure. The extensions widen at 32 and 33 ultimately forming lands 34 and 35 for external connections. An additional stage 36 of chevron elements is shown interconnected by the sections 32 and 33 where those sections approach lands 34 and 35 to ensure passage of the expanded domain to the external region of layer 11. It should be noted that the guard rail elements are isolated from one another and that no electrical path is formed therebetween in the area 37 between the lands.

It should be clear at this junction, that a dynamic guard rail responsive to a rotating in-plane field for moving spurious domains away from an operative bubble memory and operative to prevent domains in external regions from encroaching on an operative memory is adapted herein to eliminate expanded and already detected data domains in a like manner. In order to adapt the guard rail for such operation, care is exercised to ensure that spurious domains cause little problem at the expansion detector. To this end, the path of the guard rail is modified to occupy areas closely spaced from the sides of the expansion detector as shown in FIG. 2. This path modification reduces the chance of a spurious domain entering the expansion detector.

Even if a spurious domain should enter the expansion detector, its speed of advancement would be too fast to permit sufficient lateral expansion thereof to provide a data signal. An appropriate expansion of domains to an appropriately expanded size for detection is accomplished by movement of a domain through a certain number of stages starting at arrow 38 in FIG. 2. A spurious domain would most likely not enter the detector at arrow 38 and thus advance through a sufficient number of stages to expand appropriately particularly at the normal high speed of operation. And even spurious domains entering the detector at arrow 36 would cause only temporary errors in the data stream.

In practice, the stages of detector 15 may include additional elements than necessary to expand domain Do at the initial stages thereof in order to fill the area to the sides of the detector. The additional elements help avoid problems due to spurious domains there.

As is normal of bubble memory operation, domains for detection are generated selectively at an input position represented by arrow 40 in channel 13 of FIG. 1. An input pulse source 41 is shown in FIG. 1 for providing suitable inputs. The transfer (or replication) of domains for movement between the loops of FIG. 1 is responsive to a transfer pulse source represented by block 42 of FIG. 1.

Circuit 19, and sources 16, 17, 41, and 42 are under the control of a control circuit 43 of FIG. 1. The various sources and circuits comprise any such elements capable of operating in accordance with this invention.

An expansion detector normally provides attractively high signals of the order of 50 millivolts. The penalty for such signals, of course, is the relatively large area of layer 11 occupied by the detector. When an expansion detector is structured with consecutive stages including decreasing numbers of elements to reduce the size of an expanded domain after detection, the area occupied by the detector is twice as large as the area necessary to expand the domain for detection. Moreover, the detected, and (thereafter reduced-in-size) domain has to be moved along an exit channel to an annihilator which occupies even more space. In accordance with the present invention, no reduction in the size of a detected domain is necessary; nor is an exit channel or an annihilator necessary to eliminate detected domains.

As an added advantage, even greater than expected domain expansion is possible by positioning the magnetoresistance element in the guard rail itself. The domain, in this case, expands not only as dictated by the increasing numbers of elements in the detector, but also as permitted by the much greater number of elements in the guard rail up to the position selected for the magnetoresistance element. Since the output signal is a function of the size of the domain, it is clear that relatively large signals are achieved in this manner without additional sacrifice in the area of layer 11 utilized.

What has been described is considered merely illustrative of the principles of this invention. Therefore, various modifications can be devised by those skilled in the art in accordance with those principles within the spirit and scope of this invention as encompassed by the following claims.

What is claimed is:

1. Magnetic apparatus comprising a layer of material in which single wall domains can be moved, means for defining in said layer a memory in which domains are moved from a first to a second position responsive to a magnetic field reorienting in the plane of said layer, means for defining in said layer a dynamic guard rail encompassing said memory and operative to move domains outwardly from said memory in response to said field, means for defining an expansion detector at said second position operative to expand domains while moving said domains from said second to a detection position, said means for defining an expansion detector being also operative responsive to said field and disposed adjacent a portion of said guard rail for advancing directly therethrough expanded domains at said detection position.

2. Apparatus in accordance with claim 1 wherein said guard rail comprises consecutive rows of magnetically soft elements defining consecutive stages for advancing domains therethrough in response to consecutive cycles of said field.

3. Apparatus in accordance with claim 2 wherein said expansion detector comprises magnetically soft elements in a pattern to define consecutive stages each including a different number of said elements to expand a domain moved therethrough to said detection position.

4. Apparatus in accordance with claim 3 wherein the elements of the consecutive rows of said guard rail are disposed to advance expanded domains at said detection position to an area external thereof.

5. Apparatus in accordance with claim 4 wherein the pattern of elements of said expansion detector and at least that portion of said guard rail operative to accept expanded domains from said detection position is fine grained.

6. Apparatus in accordance with claim 5 wherein said guard rail follows a path closely spaced apart from the sides of said expansion detector.

7. Apparatus in accordance with claim 5 wherein the remaining portion of said guard rail is defined by a pattern of T-shaped elements.

* * * * *